United States Patent [19]
Lefebvre

[11] 3,711,078
[45] Jan. 16, 1973

[54] PROCESS FOR THE TREATMENT OF THE CRUDE MIXTURE RESULTING FROM THE PREPARATION OF AN ADIPONITRILE BY DIMERIZATION

[75] Inventor: Henri Lefebvre, Jemeppe-sur-Sambre, Belgium

[73] Assignee: Solvay & Cie, Brussels, Belgium

[22] Filed: June 12, 1970

[21] Appl. No.: 45,724

[30] Foreign Application Priority Data

June 16, 1970 France..................................7020040

[52] U.S. Cl. ..........................................260/465.8 A
[51] Int. Cl..............................................C07c 121/26
[58] Field of Search..............................260/465.8 A

[56] References Cited

UNITED STATES PATENTS 3,523,967   8/1970   Dewar et al. ..................260/465.8 A
3,552,932   1/1971   Badham.......................260/465.8 A X Primary Examiner—Joseph P. Brust
Attorney—Robert E. Burns and Emmanuel J. Lobato

[57] ABSTRACT

A portion of the crude reaction mixture which is obtained by dimerization of a nitrile with an alkali or alkaline earth metal amalgam is continuously withdrawn. The withdrawn portion is separated into an organic liquid phase and a solid phase composed of the salt formed during the dimerization reaction or as a result of neutralization after the dimerization. The salt is washed with propionitrile which has been formed as a secondary product during the dimerization and the washing liquid is added to the organic liquid phase. The entire organic phase is distilled in order to recover each component thereof; the adiponitrile is recovered and the propionitrile which has been isolated, is recycled to the salt washing step.

7 Claims, 1 Drawing Figure

PROCESS FOR THE TREATMENT OF THE CRUDE MIXTURE RESULTING FROM THE PREPARATION OF AN ADIPONITRILE BY DIMERIZATION

BACKGROUND OF THE INVENTION

This invention concerns a process for the treatment of the crude mixture resulting from the dehalogenating dimerization of a β-halogenated propionitrile. The invention also relates to the products resulting from the hydrodimerization of acrylonitrile by means of an amalgam, after neutralizing the alkali by-product obtained during the hydrodimerization with an acid.

The dehalogenating dimerization of a β-halogenated propionitrile by means of an alkali or alkaline earth metal, amalgam in the presence of a solvent which is inert towards the amalgam under the conditions of the reaction and which possesses a high dielectric constant has been described in French Patent Nos. 1,489,206, 1,522,124 and 94,291 which are incorporated herein by reference.

The solvents which are preferred for this process, as well as in the processes for hydrodimerizing acrylonitrile by means of an amalgam include dimethylformamide, formamide, dimethylsulfoxide, hexamethylphosphorotriamide and mixtures thereof.

In the hydrodimerization of acrylonitrile, the extraction of the organic products from the reaction mixture by means of a non-polar solvent, such as methylene chloride, chloroform, toluene or xylene, is known. However, extraction with a solvent which has to be taken from outside of the system is a costly operation since substantial quantities of solvent are required which must be separated later and recovered. To overcome this disadvantage, it has been proposed to extract the organic products by means of acrylonitrile which can be recycled to the hydrogenating dimerization stage after distillation of the phase which has been extracted (French Patent No. 1,535,374, dated Sept. 1, 1967, issued to Toyo Koatsu Industries).

SUMMARY OF THE INVENTION

It has now been found that it is possible and desirable to treat the effluent which exits from the dimerizer without using either an outside solvent or one of the reactants.

In accordance with the process of the present invention, the organic products which are impregnated on the alkali or alkaline earth metal salt are recovered by washing with propionitrile, which is a by-product of the reaction. It must be noted that alkali or alkaline earth metal salt is formed during the reaction in the case of the dehalogenating dimerization of β-halogenated propionitriles and is formed after the reaction by neutralizing the reaction mixture with an acid in the case of the hydrodimerization of acrylonitrile.

The present invention therefore involves continuously withdrawing a portion of the reaction mixture from the dimerization reactor, in the case of hydrodimerization after neutralization with an acid, separating this portion into an organic phase and a solid phase, the latter comprising the salt which is formed, washing this salt with propionitrile which is a by-product of the reaction, adding the washing liquid to the organic phase, distilling the entire organic phase in order to recover each component thereof and recycling the propionitrile which has been isolated to wash the salt.

BRIEF DESCRIPTION OF THE DRAWING

The drawing is a flow diagram which illustrates an installation for carrying out the process of the present invention.

DESCRIPTION OF THE INVENTION

Figure 1:
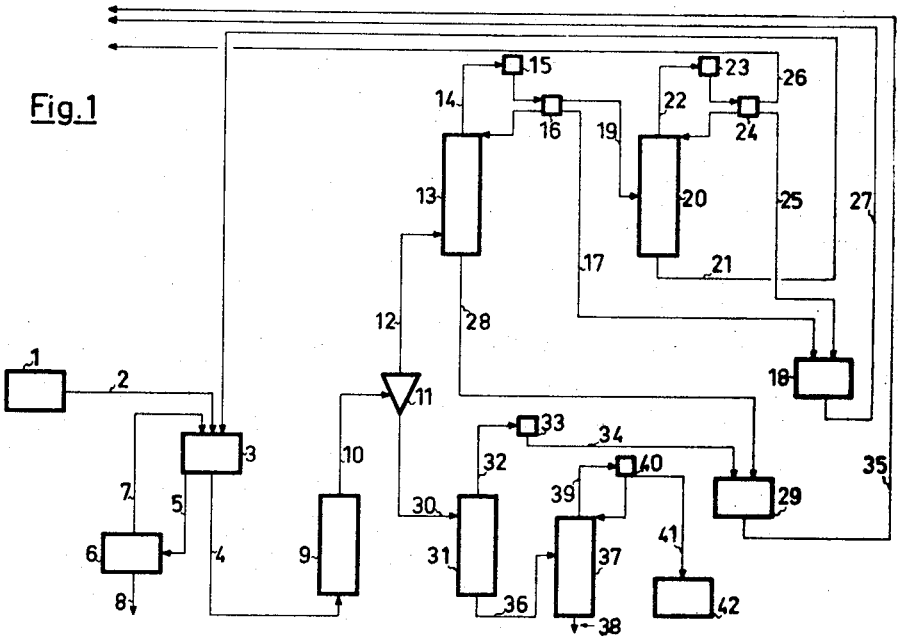

In the dehalogenating dimerization of a β-halogenated propionitrile and in the hydrodimerization of acrylonitrile after neutralization step, the crude broth contains a substantial quantity of salt which is conveniently separated from the organic phase before carrying out any other operation. This separation can be carried out by any known method of solid-liquid separation such as filtration, centrifugation or drying. The process according to the present invention is advantageously carried out in a centrifugal dryer which operates continuously. The salt which is separated under these conditions is impregnated with a certain quantity of the organic phase which must be recovered.

According to the present invention, washing of the salt is carried out with propionitrile. This operation preferably takes place during separation of the salt in the centrifugal dryer which is operated continuously. This washing step enables the recovery of the organic products which impregnate the salt, i.e. adiponitrile, β-halogenated propio- and/or acrylonitriles and the solvent.

The salt which has been washed and dried is still impregnated with a small quantity of propionitrile and the latter is advantageously separated and partially recycled to wash the salt. Recovery of the propionitrile which still impregnates the salt after drying and washing is easily carried out by an ordinary evaporation.

It is not necessary to recover the total quantity of propionitrile; it is sufficient to evaporate only a portion thereof in order that the remaining quantity of propionitrile which still impregnates the salt after evaporation corresponds to the amount produced in the dimerizer.

In the case where the salt is metallic halide and when recycling to an electrolysis step is considered, the evaporation of propionitrile will obviously be more complete, however the quantity of propionitrile which is recycled to the washing step is always determined in accordance with the criterion described above.

It may also be advantageous to remove a portion of the organic phase before combining the latter with the washing liquid at the output of the separator. The portion which is removed can then be recycled to the initial step of dimerization in order to decrease the salt concentration in the broth.

At the output of the dryer, the washing liquid is combined with at least a portion of the organic phase and this mixture will be used for the next treatment which consists in isolating the adiponitrile product. This treatment must be carried out with great care because certain organic products which are present have a tendency to decompose at elevated temperature.

To prevent any decomposition of these products, the separation of the adiponitrile and of the other organic products from the reaction mixture is preferably carried out under reduced pressure in two steps.

The first step is intended to separate the light components of the mixture, without carrying along too much adiponitrile. The operation advantageously takes place in a rising film evaporator of the Kestner type under a pressure of the order of 100 to 150 mm. of mercury.

The light products which are thus separated comprise propionitrile, acrylonitrile and water, possibly unreacted β-halogenated propionitrile and a portion of the solvent.

This light fraction is sent to a distillation apparatus in order to fractionate it into its various components. The propionitrile which has been separated is recycled to the separator-washer, while the other components are recycled, either to the acrylonitrile hydrochlorination stage or to the dimerization stage.

The heavy products are submitted to a second fractionating step, which is carried out under a higher vacuum in order to separate the remaining light products from adiponitrile. Before being recycled, the light products are combined with those obtained from the light fraction in the first step of the separation.

This second step advantageously takes place in a distillation column having a stripping zone which is sufficient to prevent the solvent or β-halogenated propionitrile from reaching the boiler. The distillation residue which is composed of adiponitrile and heavy products such as trimers is finally rectified in a known manner by distillation under reduced pressure, and adiponitrile is collected continuously.

The accompanying FIG. 1 is a flow diagram which illustrates a plant for the continuous separation of the components of the reaction mixture resulting from the dehalogenating dimerization of a β-halogenated propionitrile together with the continuous washing of the salt formed during the dehalogenating dimerization, by means of propionitrile formed as a by-product during the dimerization reaction.

This plant is arranged after the dimerizer 1 in which a portion of the broth is continuously withdrawn and sent by way of the duct 2 into a separator-washer 3. The propionitrile by-product which has been separated in a later step in the process is brought to the separator-washer 3 by way of the duct 21, in order to wash the salt. The salt which has been separated and washed is sent via duct 5 into an evaporator 6 from which propionitrile, which has been recovered is recycled to separator 3 via duct 7 after condensation, and the salt which has been partially purified is eliminated through conduit 8.

The combined washing liquid and liquid phase are sent via duct 4 into a rising film evaporator 9. The mixture of liquid and vapor which continuously exits from the evaporator 9 via duct 10 is separated in the liquid-vapor separator 11 into a light fraction and a heavy fraction. The light fraction is sent by means of duct 12 into distillation column 13. The heavy fraction, which is enriched in adiponitrile flows through duct 30 into distillation column 31.

The end fraction of column 13, which has a large proportion of solvent, is sent via duct 28 into tank 29.

The fraction from the top of the distillation column 13 is sent via line 14 to the condenser 15 and then to the decanter 16. A portion of the nitrile phase which is separated in decanter 16 is recycled at the top of the distillation column 13 in order to maintain reflux conditions. The water which is decanted is sent via duct 17 into container 18. The remaining portion of the organic phase which is decanted at 16 is brought by means of duct 19 into distillation column 20.

The end fraction of column 20 which is composed of 100 percent propionitrile is continuously recycled via duct 21 to the washer-separator 3. The top fraction from column 21 is sent via line 22 to condenser 23 and then to decanter 24. A portion of the material in decanter 24 is recycled to the top of the distillation column 20 in order to maintain reflux conditions, and the remaining portion is sent via duct 25 toward container 18. The water which is collected in container 18 is continuously recycled to the top of the dimerization stage. The organic phase which is decanted in the decanter 24, and which is enriched in acrylonitrile is continuously recycled after drying via duct 26 to the plant for producing β-halogenated propionitrile by hydrohalogenation.

The heavy fraction which is separated in the liquid-vapor separator 11 is freed from the light products which are still present in the distillation column 31. The fraction from the top of column 31 is sent via duct 32 into the condenser 33 after which the condensed product is sent via duct 34 to container 29.

The organic phase which is enriched in solvent is collected at 29 and is continuously recycled to the top of the dimerization stage by means of duct 35.

The end fraction of column 31, which is essentially composed of adiponitrile, is sent via duct 36 into a distillation column 37. The end fraction of the column 37 is essentially composed of higher oligomers of adiponitrile, which are eliminated through duct 38. The top fraction is sent via duct 39 to the condenser 40 where a portion of the condensed product is continuously recycled to the top of column 37 and the remaining portion which corresponds to the production of adiponitrile is continuously sent via duct 41 into adiponitrile storing container 42.

The following example which will be described with reference to FIG. 1, illustrates the present invention, but it must not be construed as restricting the invention in any manner. This example concerns the continuous separation of the adiponitrile produced by the dechlorinating dimerization of β-chloropropionitrile by means of sodium amalgam in the presence of dimethylsulfoxide. However, this process may also be used for the dehalogenating dimerization of other β-halogenated propionitriles by means of alkali and alkaline earth amalgams other than sodium and in the presence of solvents which are inert towards the amalgam and possess a high dielectric constant other than dimethylsulfoxide.

EXAMPLE

A broth, a portion of which is continuously withdrawn from the dimerizer 1, is sent via duct 2 into the separator-washer 3. This broth has the following composition, the concentrations being given in grams per kilogram:

| | |
|---|---|
| acrylonitrile | 18 |
| chloropropionic nitrile | 34 |
| propionitrile | 47 |
| adiponitrile | 273 |
| dimethylsulfoxide | 286 |

| | |
|---|---|
| sodium chloride | 278 |
| water | 36 |
| trimers and various impurities | 28 |

The sodium chloride is separated and after being washed with propionitrile still contains 19 g./kg. of propionitrile. The salt is sent via duct 5 into the evaporator 6 where 5.5 kg. of propionitrile are evaporated per hour and are recycled via duct 7 to the washer-separator 3. Sodium chloride is eliminated through line 8 and can be recycled to be electrolyzed after having been more thoroughly refined. The washing liquid and liquid phase are combined forming mixture No. 1, having the composition shown in column 1 of Table 1 and this mixture is sent via duct 4 into a rising film evaporator 9 which is kept under a pressure of 100 mm. of mercury. The mixture of liquid and vapor which continuously exits from the evaporator 9 via duct 10 is separated in the liquid-vapor separator 11 into a vapor phase which forms mixture No. 2, having the composition shown in column 2 of Table 1 and a liquid phase which forms mixture No. 3, having the composition shown as column 3 of Table 1. The vapor phase is sent via duct 12 into distillation column 13, which is kept under a pressure of 100 mm. of mercury. The end fraction of the column 13, which is enriched in dimethylsulfoxide, is sent via duct 28 into container 29.

The top fraction of column 13 is sent via duct 14 to condenser 15 then to decanter 16. A portion of the organic phase which separates in the decanter 16 is recycled to the top of column 13 to maintain reflux conditions; the remaining portion which forms mixture 4, having the composition shown in column 4 of Table 1 is sent via duct 19 into distillation column 20. The aqueous phase which is decanted in the decanter 16 is sent via duct 17 into the container 18.

The end fraction of the column 20, comprising 100 percent propionitrile is continuously recycled via duct 21 to the separator 3.

The top fraction is sent via duct 22 to the condenser 23 then to decanter 24. A portion of this fraction is recycled to the top of column 20 to maintain reflux conditions, and the remaining portion is sent via duct 25 towards container 18. The water which is collected in the container 18 is continuously recycled to the top of the dimerization stage. After a preliminary drying, the organic phase which is decanted in the decanter 24, and which comprises acrylonitrile containing 5.2 percent by weight of propionitrile is continuously recycled to the hydrochlorination stage.

The heavy fraction which is separated in the cyclone 11 is sent to the distillation column 31 to be freed of the light products which are still present. The vapor mixture which exits at the head of the column 31 is sent via duct 32 to the condenser 33, and the condensation product is sent via duct 34 to container 29. The organic phase which is enriched in dimethylsulfoxide, and which is collected in the container 29 is continuously recycled to the top of the dimerization stage.

The end fraction of the column 31 which forms mixture No. 5 having the composition indicated in column 5 of Table 1 is sent via duct 36 into distillation column 37. The end fraction of the column 37, which essentially comprises oligomers of adiponitrile, is eliminated through duct 38. The top fraction is sent via duct 39 to the condenser 40 where a portion of the condensation product is continuously recycled to the head of column 37 and the remaining portion corresponding to the production of adiponitrile is continuously sent via duct 41 into a storing reservoir 42 for adiponitrile.

TABLE 1

| Mixture No. | 1 | 2 | 3 | 4 | 5 |
|---|---|---|---|---|---|
| Composition in g./kg. of Liquid Phase | | | | | |
| acrylonitrile | 22 | 40 | 4 | 108 | — |
| $\beta$-chloropropionitrile | 41 | 55 | 27 | — | — |
| Propionitrile | 187 | 347 | 30 | 840 | — |
| Adiponitrile | 333 | 50 | 609 | — | 924 |
| Dimethylsulfoxide | 348 | 434 | 265 | — | — |
| Water | 44 | 74 | 15 | 52 | — |
| Heavy fractions and various impurities | 23 | — | 47 | — | 71 |
| Sodium Chloride | 2 | — | 3 | — | 5 |

What I claim as new and desire to secure by Letters Patent is:

1. In a process for treating the crude mixture resulting from the dehalogenating dimerization of a $\beta$-halogenated propionitrile by means of an alkali metal or alkaline earth metal amalgam, said crude mixture comprising an organic liquid phase containing adiponitrile product and propionitrile by-product and a solid alkali metal or alkaline earth metal salt, the improvement which comprises, separating said crude mixture into said organic liquid phase and a solid phase comprised of said salt, distilling said organic liquid phase to separate and recover said adiponitrile product and said propionitrile by-product, washing said solid phase in order to recover the liquid organic products which are impregnated on said solid phase by means of a washing liquid consisting of said propionitrile by-product which has been separated and recovered and adding the liquid recovered from said washing to said organic liquid phase prior to said distilling.

2. In a process for treating the crude mixture resulting from the hydrogenating dimerization of acrylonitrile by means of an alkali metal or alkaline earth metal amalgam, followed by the neutralization of said dimerization reaction mixture with an acid, said crude mixture comprising an organic liquid phase containing adiponitrile product and propionitrile by-product and a solid alkali metal or alkaline earth metal salt, the improvement which comprises, separating said crude mixture into said organic liquid phase and a solid phase comprised of said salt, distilling said organic liquid phase to separate and recover said adiponitrile product and said propionitrile by-product, washing said solid phase in order to recover the liquid organic products which are impregnated on said solid phase by means of a washing liquid consisting of said propionitrile by-product which has been separated and recovered and adding the liquid recovered from said washing to said organic liquid phase prior to said distilling.

3. Process according to claim 1, in which said distilling of the mixture resulting from adding the liquid recovered from washing to the organic liquid phase is effected under reduced pressure in two steps comprising (1) separating a fraction comprising most of said propionitrile by-product and a fraction comprising most of said adiponitrile product and (2) separating said adiponitrile product from said fraction comprising most of said adiponitrile product in order to recycle the thus obtained fractions of propionitrile to the washing and to isolate the adiponitrile product.

4. Process according to claim 2, in which said distilling of the mixture resulting from adding the liquid recovered from washing to the organic liquid phase is effected under reduced pressure in two steps comprising (1) separating a fraction comprising most of said propionitrile by-product and a fraction comprising most of said adiponitrile product and (2) separating said adiponitrile product from said fraction comprising most of said adiponitrile product in order to recycle the thus obtained fractions of propionitrile to the washing and to isolate the adiponitrile product.

5. Process according to claim 1, in which at least a portion of the propionitrile which still impregnates the salt after separation and washing is evaporated and then recycled to the washing step in order to keep a constant quantity of propionitrile in the washing cycle.

6. Process according to claim 2, in which at least a portion of the propionitrile which still impregnates the salt after separation and washing is evaporated and then recycled to the washing step in order to keep a constant quantity of propionitrile in the washing cycle.

7. Process according to claim 1, in which the crude mixture results from the dechlorinating dimerization of $\beta$-chloropropionitrile.

* * * * *